April 10, 1928.  W. O. KENNINGTON  1,665,306

BRAKE MECHANISM OPERATED BY SUCTION

Filed Nov. 8, 1926  3 Sheets-Sheet 1

Inventor
William O. Kennington

By Blackmore, Spencer & Fluid
Attorney

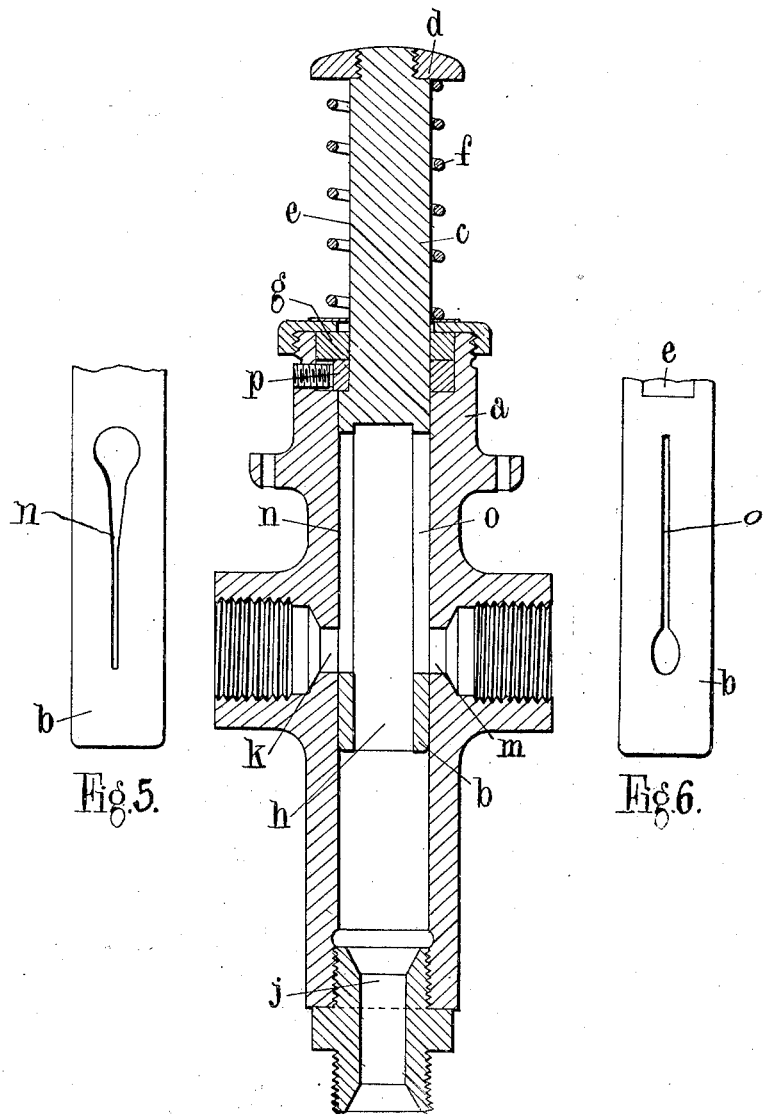

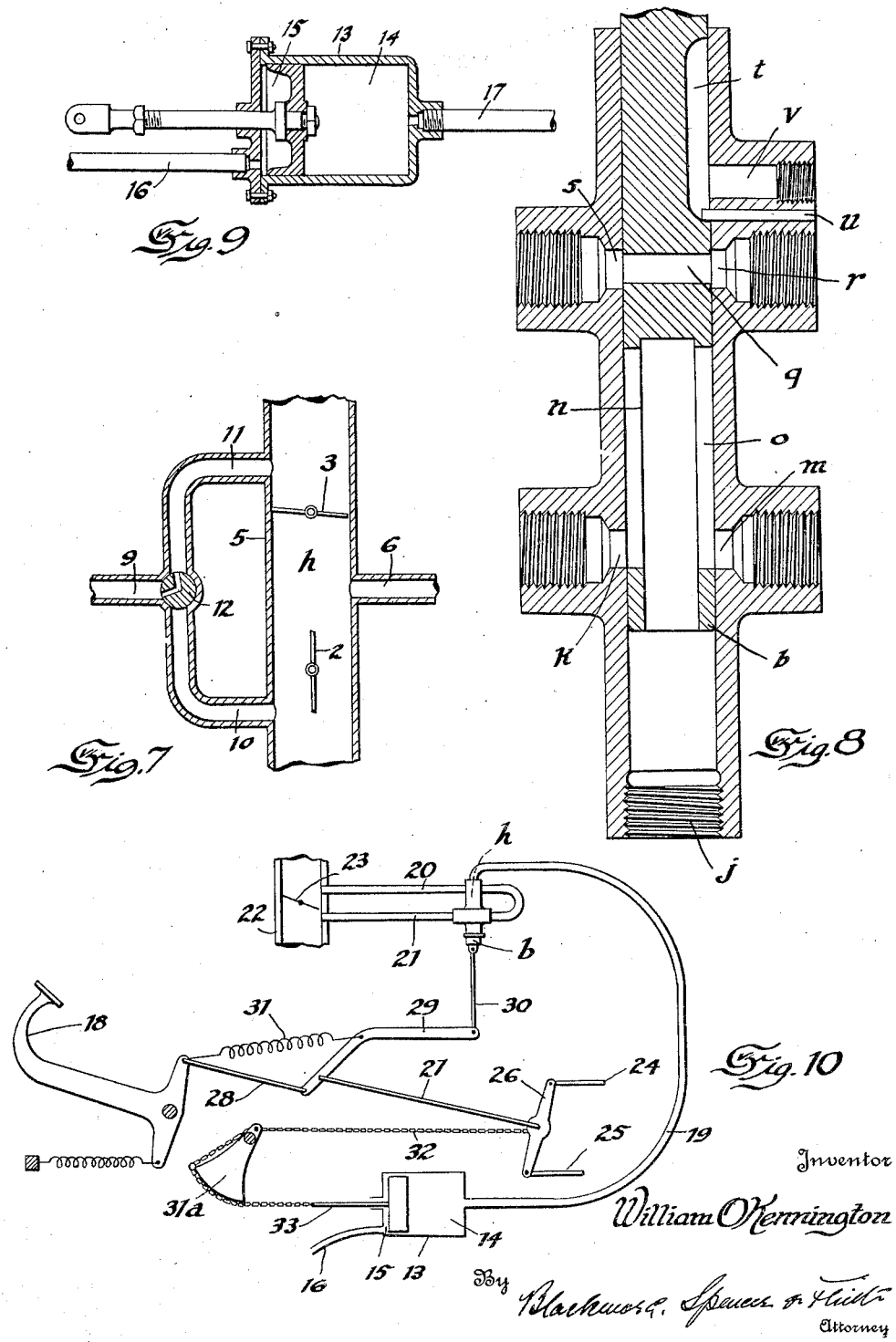

Patented Apr. 10, 1928.

1,665,306

UNITED STATES PATENT OFFICE.

WILLIAM OSCAR KENNINGTON, OF LONDON, ENGLAND.

BRAKE MECHANISM OPERATED BY SUCTION.

Application filed November 8, 1926, Serial No. 147,130, and in Great Britain November 13, 1925.

This invention relates to brake or other mechanism operated from the suction obtainable from the induction system of internal combustion engines, and has for its object to provide improved or simplified means of controlling the suction which is applied to the brake or other contrivance to be operated thereby (hereinafter termed the "pneumatic contrivance").

I have already proposed in British specification No. 228,225 to produce the progressive operation of a pneumatic contrivance for operating brakes for automobiles and the like by causing the throttle valve when moved beyond its normally closed position to vary the degree of suction applied to the pneumatic contrivance.

According to the present invention, the pipe through which engine suction is applied to the pneumatic contrivance communicates with a space which itself is adapted to be controllably subjected to the engine suction, this space being situate either in the main induction pipe or system or in a by-pass thereof, the space serving in either case as the conduit through which mixture for slow running can pass.

Figure 4 is a vertical section of a modified form of vacuum controlling device.

Figures 5 and 6 are two views in elevation of details thereof.

Figure 7 shows in section a portion of the induction pipe illustrating a modification.

Figure 8 is a vertical section of a form similar to that shown by Figure 4, illustrating a further modification.

Figure 9 is a longitudinal section through a brake operating cylinder.

Figure 10 illustrates diagrammatically a preferred arrangement by which the vacuum operated mechanism is associated with a direct mechanical brake operating linkage.

Figures 1, 2:
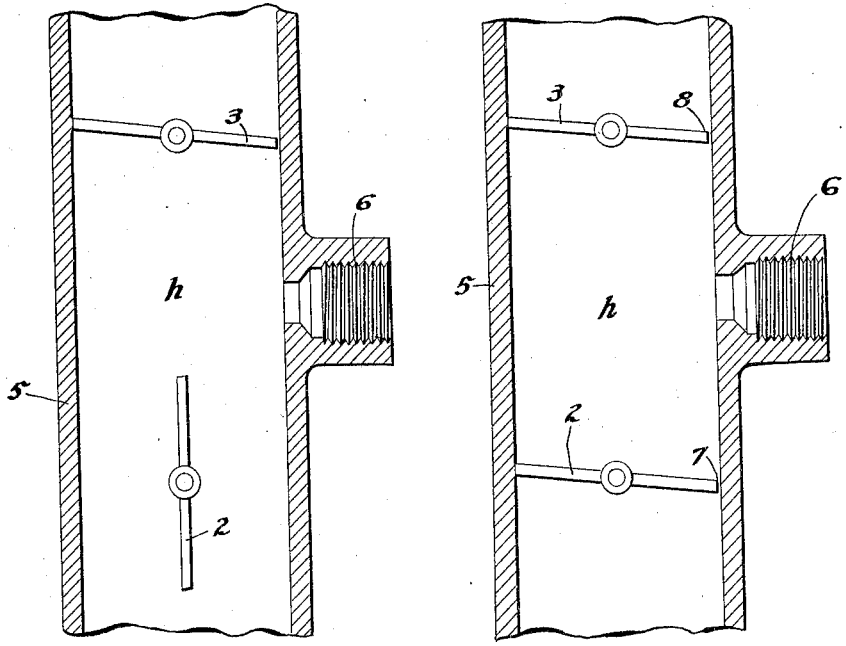
Figure 1 shows a vertical section through the induction pipe of an internal combustion engine wherein two valves are used.
Figures 2 and 3 are similar views showing the valves in different positions of adjustment.
Figure 3:
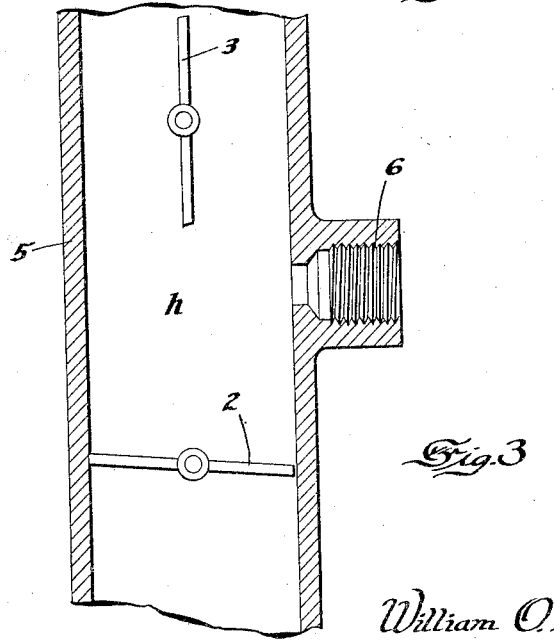

In carrying the invention into effect in one convenient manner I control the degree of suction which is applied to the said space (hereinafter referred to as the "controlled space") by providing two butterfly valves in series relationship in the main induction pipe of the engine between the carburettor and the induction manifold, and by connecting the space between these valves, which space constitutes the controlled space, by a pipe to the pneumatic contrivance. The valves are each so constructed and arranged that when moved into their "closed" positions they do not entirely cut off communication between the carburettor and the induction manifold. Thus a passageway is ensured for the mixture necessary for the slow running of the engine. In operation the valve 2 nearest the carburettor which I will term valve No. 1 is maintained fully open during normal operation of the engine, the performance of the latter being controlled in the ordinary manner by the other valve 3 which I will term valve No. 2. When it is desired, however, to bring into operation the penumatic contrivance valve 3 is brought into its "closed" position, and valve 2 also is moved into its "closed" position, and valve 3 is then re-opened. By this means the controlled space is subjected to a progressively increasing degree of engine suction. The actual suction effect in this controlled space may be achieved in any desired progression and to any desired extent by suitably co-ordinating the movements of the two valves.

In order to release the brakes the valve No. 2 is "closed" and valve 2 is returned to its full open position with the result that carburetted mixture at atmospheric pressure is now applied to the controlled space, and thus also to the pneumatic contrivance.

In some cases the re-opening of valve 3, as described above, is unnecessary, sufficient degree of vacuum being secured by the mere "closing" of the two valves.

Another convenient arrangement in accordance with the present invention is to provide a conduit which is a by-pass to the main induction pipe and to furnish this conduit with a movable sleeve or sleeves having suitable ports. The ends of the conduit are connected to the main induction pipe respectively at opposite sides of the throttle valve disposed therein, and the conduit constitutes the controlled space.

A convenient example of such an arrangement is illustrated in Figures 4 to 6, inclusive.

In the drawings $a$ is a metal casting bored internally and fitted with a sleeve $b$ which is integral with a stem $c$ carrying a foot pad $d$. A dee-washer $p$ and a flat $e$ prevent rotation of the sleeve within its cylindrical housing whilst a compression spring $f$ urges the sleeve into the position represented in Figure 1. A gland $g$ is provided to prevent any air leakage into the controlled space $h$ by way of the stem $c$.

Communicating ducts are provided at $j$, $k$ and $m$ which are adapted to be connected respectively to the pneumatic contrivance to the induction pipe at a point between the throttle valve and the engine and to the carburettor at a point on the side of the throttle valve remote from the engine.

Ports $n$ and $o$ respectively controlling the ducts $k$ and $m$ are provided in the sleeve $b$ and in the position indicated in Figure 1 it will be seen that the duct $m$ is unrestricted whereas the duct $k$ is nearly wholly obscured.

In operation according to this arrangement the engine is controlled during running in the ordinary manner by manipulation of the throttle valve but when it is desired to apply the brakes the throttle valve is brought into its "closed" position, thus stopping (or practically stopping) the passage of combustible mixture from the carburettor to the engine via the throttle valve.

Sufficient mixture to maintain idle running of the engine is allowed to pass to the engine by way of the duct $m$, the wide part of the port $o$, space $h$, the restricted part of the port $n$ and duct $k$.

The foot pad $d$ is now depressed so as abruptly to decrease the area of the passageway from the duct $m$ to the controlled space $h$ through the port $o$.

Further movement of the foot pad causes the area of the passageway to the duct $k$ from the controlled space $h$ through the port $n$ to be increased gradually.

Under these conditions a gradually increasing degree of vacuum is applied to the controlled space $h$ through the duct $k$ whilst communication through the duct $m$ is rapidly reduced to a considerable extent. The pneumatic contrivance is thus actuated and the brakes applied.

In order to release the brakes it is merely necessary to release the stem $c$ so that the spring $f$ may return the sleeve into the position shown in Figure 1, i. e. with the controlled space in free communication through the duct $m$ with the atmospheric pressure side of the throttle valve and with the controlled space almost cut off from communication with the suction side of the throttle.

As an alternative to using a single sleeve with two ports two separate sleeves each with a port may be employed.

In any of the examples indicated above I may provide auxiliary communication between the pneumatic contrivance and the housing of the valve or valves which serve to control the suction. Such auxiliary communication is indicated by a pipe 9, Figure 7, the branches 10 and 11 of which are connected to the induction pipe 5 respectively below the valve 2 and above the valve 3.

A valve 12 is provided which in the position shown in Figure 7 (which corresponds to the idle running condition of the engine) applies the full engine suction to the pipe 9. The pipe 9 is connected to the pneumatic contrivance at the opposite or "brake release" side of the piston to the normal operative side and under these conditions the brakes are held off.

As the valves 2 and 3 are manipulated to produce engine suction in the control space $h$ however, the valve 12 is rotated so as to disconnect the pipe 9 from the branch 11 and connect it instead to the branch 10 thus admitting combustible mixture at atmospheric pressure to the release side of the pneumatic contrivance. Preferably this release is performed just prior to the application of engine suction to the control space $h$. By this means rapidity of and certainty of operation of the pneumatic contrivance is assured.

In a modification illustrated in Figure 8 this auxiliary valve arrangement is embodied in the mechanism similar to that illustrated in Figure 4. The sleeve $b$ however at its upper end is formed with a plunger portion provided with a lateral hole $q$ which in the position shown registers with ports $r$ and $s$ which communicate respectively with the release side of the pneumatic contrivance and with a point on the induction pipe or carburetor lying between the throttle and the engine.

This plunger portion also embodies a longitudinal duct $t$ (which incidentally in conjunction with a pin $u$ serves to prevent rotation but to permit reciprocation of the sleeve $b$) by which the port $r$ may be put into communication with the port $v$ connected with the induction pipe or carburetor at a point between the throttle and carburetor.

In operation when the sleeve and plunger occupy the position indicated in Figure 8 as the engine throttle is closed engine suction is applied through port $s$, duct $q$ and port $r$ to the release side of the pneumatic contrivance but as soon as the plunger is depressed this communication is cut off and communication is established between ports $v$ and $r$, thus admitting combustible mixture at atmospheric pressure to the release side practically simultaneously with the application of engine suction to the operative side of the pneumatic contrivance.

In some cases instead of providing the auxiliary communication described above I may connect the brake release side of the pneumatic contrivance with the engine crank casing so that a certain amount of oil mist may enter, such connection thus serving to maintain lubricated the pneumatic contrivance. An example of this arrangement is illustrated in Figure 9 in which 13 represents the pneumatic contrivance, 14 being the operative side whilst 15 is the release side with which a pipe 16 connected to the engine crank case communicates. Connection to the control space is taken by means of a pipe 17.

If desired, a normal brake pedal may be coupled through a lost motion device to mechanism for moving the valve or valves controlling the suction, thus enabling application of the brakes to be augmented positively or enabling them to be operated should any failure in the suction system arise, or should the engine be at rest. An example of this arrangement is illustrated in Figure 10 in which 18 represents a brake pedal, 13 a pneumatic cylinder the release side 15 of which is connected by pipe 16 to the engine crank case (not shown). The operative side 14 is connected by pipe 19 to a control chamber (such as $h$ Figure 4) and connections are also made from the latter by pipes 20, 21 to the carburetor or induction pipe 22 on opposite sides of the throttle 23.

Brake rods 24, 25, are connected to an equalizer bar 26 which is coupled to the brake pedal 18 by rods 27, 28. A cranked lever 29 is pivoted to these rods 27, 28 and is connected with the control space plunger or sleeve $b$ by a pivotal link 30 as shown, a tension spring 31 being also provided as shown. To the equalizer bar 26 is also connected a chain 32 passing over a pivoted sector piece 31$^a$ and coupled to the piston rod 33.

In operation normally the parts occupy the position illustrated in Figure 10, the brakes being in released position. When the pedal 18 is depressed, however, in order to apply the brakes (the throttle 23 being "closed") the spring 31 is or can be sufficiently stiff to prevent the cranked lever 29 from rocking until the brakes are applied by manual effort alone. Further pressure on the pedal 18, however, causes the spring 31 to be extended, thus allowing the cranked lever 29 to rock and thereby to withdraw the plunger B. This is arranged to apply engine suction to 14 according to the extent of plunger movement and the piston rod 33 moves to the right, thus further applying the brakes by moving the equalizer bar 26 to the left. The total braking effort attained depends upon the amount of rocking of the lever 29 and thus upon the pressure applied to the brake pedal 18. The actual effort exerted is obtained partly from the piston rod 33 and partly by direct foot pressure. Foot pressure alone may be employed in the event of the engine being at a standstill.

Having now described my invention what I claim as new and desire to secure by Letters Patent is:—

1. Suction control mechanism including a controlled space in permanent communication with a pneumatic contrivance and a pair of valves or ports serving respectively to control entry of mixture into and exit of same from said space.

2. Suction control mechanism wherein two valves are provided in the induction pipe, the space between said valves constituting the controlled space and one of said valves serving as the engine throttle valve during ordinary running of the engine.

3. Suction control mechanism as claimed in claim 1, wherein the ratio of the respective openings determined by the two valves or ports determines the degree of suction utilized whilst sufficient opening is maintained to ensure the passage of adequate mixture for running of the engine.

4. Suction control mechanism as claimed in claim 1, wherein suction is applied to the release side of the pneumatic contrivance prior to the admission of atmospheric pressure which latter accompanies the application of suction to the working side of the pneumatic contrivance.

5. Suction control mechanism as claimed in claim 1, wherein the release side of the pneumatic contrivance is connected to the engine crank case for the purpose described.

In testimony whereof I have signed my name to this specification.

WILLIAM OSCAR KENNINGTON.